United States Patent
Williamson et al.

[11] Patent Number: 5,898,871
[45] Date of Patent: Apr. 27, 1999

[54] DYNAMIC OBJECT COMMUNICATION PROTOCOL

[75] Inventors: Richard Williamson, San Francisco; Linus Upson, Half Moon Bay; Daniel Willhite, San Francisco, all of Calif.; Jack Greenfield, Reston, Va.

[73] Assignee: NeXT Software, Inc., Redwood City, Calif., CA

[21] Appl. No.: 08/863,416

[22] Filed: May 27, 1997

Related U.S. Application Data

[63] Continuation of application No. 08/353,524, Dec. 7, 1994, abandoned.

[51] Int. Cl.⁶ .................................................. G06F 9/40
[52] U.S. Cl. ................................... 395/683; 707/103
[58] Field of Search ........................... 395/680, 682, 395/683; 707/3, 4, 5, 104, 103

[56] References Cited

U.S. PATENT DOCUMENTS 5,247,665  9/1993  Matsuda et al. ..................... 707/101

OTHER PUBLICATIONS

Beeri, Catriel, "New Data Models and Languages—the Challenge", ACM, pp. 1–15, 1992.

Gravano et al., "The Effectiveness of GlOSS for the Text Database Discovery Problem", ACM, pp. 126–137, May 1994.

Nguyen, Mai, "An Introduction to the Enterprise Objects Framework", NeXTSTEP Developer Journal, p. (13), Jun. 1994.

Hope, Mary, "Every Software Developer Needs Good Tools", EXE, p. (20), Apr. 1994.

Closkey, Cynthia, "appDidInit:", NeXTSTEP Developer Journal, p. (1), Jun. 1994.

(no author given), "Info Panel", NeXTSTEP Developer Journal, p. (3), Jun. 1994.

*Primary Examiner*—Alvin Oberlay
*Assistant Examiner*—St.-John Courtenay, III
*Attorney, Agent, or Firm*—Hecker & Harriman

[57] ABSTRACT

The present invention provides a uniform method for dynamically determining an object's communication requirements. The invention provides the ability to determine the requirements for communicating with an object regardless of the object's implementation (i.e., whether keys were implemented as methods or instance variables). The invention is used in conjunction with the runtime description of an object to provide a technique for communicating with an object. The present invention uses "key-value coding" to represent data. Key-value coding uses a dictionary of key-value pairs to represent a property and a value of the property. For example, a data value, "Joe" stored in a column of a database table that contains employees' first names is represented in a key-value pair as: Key="firstName", Value="Joe". The property of the key in this key-value pair is "firstName". The method for loading data into an object is "takeValuesFromDictionary". This method takes a dictionary of key-value pairs and in the default implementation it runs through that dictionary and looks for any key names that match the "get" or "set" method call. The method for getting values is valuesForKeys:, which extracts the value for each key in the array passed in and returns the key-value pairs in a dictionary.

10 Claims, 8 Drawing Sheets

| lastName 401 | firstName 402 | employee Number 403 | salary 404 | employment StartDate 405 |
|---|---|---|---|---|
| Brown | Jane | 1567 | $35,000.00 | 10/11/91 |
| Johnson | Richard | 7462 | $30,000.00 | 8/4/90 |
| Miller | Susan | 3544 | $37,500.00 | 6/6/88 |
| Jones | William | 5673 | $45,000.00 | 12/3/88 |
| Smith | James | 7845 | $26,000.00 | 12/1/94 |

FIG. 4 rowid=1

| lastName | Brown |
|---|---|
| firstName | Jane |
| employeeNumber | 1567 |
| salary | $35,000.00 |
| employementStartDate | 10/11/91 | rowid=2

| lastName | Johnson |
|---|---|
| firstName | Richard |
| employeeNumber | 7462 |
| salary | $30,000.00 |
| employementStartDate | 8/4/90 | rowid=3

| lastName | Miller |
|---|---|
| firstName | Susan |
| employeeNumber | 3544 |
| salary | $37,500.00 |
| employementStartDate | 6/6/88 | rowid=4

| lastName | Jones |
|---|---|
| firstName | William |
| employeeNumber | 5673 |
| salary | $45,000.00 |
| employementStartDate | 12/3/88 | rowid=5

| lastName | Smith |
|---|---|
| firstName | James |
| employeeNumber | 7845 |
| salary | $26,000.00 |
| employementStartDate | 12/1/94 |

FIG. 5

DYNAMIC OBJECT COMMUNICATION PROTOCOL

This is a continuation of application Ser. No. 08/353,524 filed on Dec. 7, 1994, now abandoned.

BACKGROUND OF THE PRESENT INVENTION

1. Field of the Invention

This invention relates to the field of transmitting data between objects and data sources.

2. Background Art

Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation." In object-oriented programming, operations that can be performed on the data are referred to as "methods."

An object can be instructed to perform one of its methods when it receives a "message." A message is a command or instruction to the object to execute a certain method. It consists of a method selection (name) and arguments that are sent to an object. A message tells the receiving object what to do.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are generally based on one of two schemes for representing general concepts and sharing knowledge. One scheme is known as the "class" scheme. The other scheme is known as the "prototype" scheme. Both the class-based and prototype-based object-oriented programming schemes are generally described in Lieberman, "Using Prototypical Objects to Implement Shared Behavior in Object-Oriented Systems," OOPSLA 86 Proceedings, September 1986, pp. 214–223.

An object that describes behavior is called a "class." Objects that acquire a behavior and that have states are called "instances." Thus, in the objective C language, which is the computer language in which the preferred embodiment of the present invention may be implemented, a class is a particular type of object. In objective C, any object that is not a class object is said to be an instance of its class. The classes form a "hierarchy." Each subclass in the hierarchy may add to or modify the behavior of the object in question and may also add additional states.

One command that is often performed on an object is the loading of data into that object from a data source. This may occur when data from a database, for example, is to be loaded into one or more objects. In the prior art, data is loaded into an object by creating a link between the source of data and the destination of the data. This link is created by generating and compiling code. Code generation is required because the object must be able to interface with the data source and vice versa.

A disadvantage of the prior art code generation is the need to generate code for data loading. This creates source code management problems such as recompiling and redistributing.

Another disadvantage is that there must be a suitable interface for each object type and/or data source. The object may be defined such as to store data in a certain format, while the data source may store its data in a different format. There must be some translation of the format of the data of the data source into the format of the data of the object.

SUMMARY OF THE INVENTION

The present invention provides a uniform method for dynamically determining an object's communication requirements. The invention provides the ability to determine the requirements for communicating with an object regardless of the object's implementation (i.e., whether keys were implemented as methods or instance variables). The invention is used in conjunction with the runtime description of an object to provide a technique for communicating with an object.

The present invention uses "key-value coding" to represent data. Key-value coding uses a dictionary of key-value pairs to represent a property and a value of the property. For example, a data value, "Joe" stored in a column of a database table that contains employees' first names is represented in a key-value pair as: Key="firstName", Value="Joe". The property of the key in this key-value pair is "firstName".

Key-value pairs are used to examine an object at runtime. An object is examined by comparing its method(s) and/or instance variable(s) with key-value pairs. The dynamic object communication protocol provides the ability to make a runtime determination of communication requirements for any object regardless of the object's implementation. Further, the dynamic object communication protocol provides a uniform method to communicate with an object.

The method for loading data into an object is "takeValuesFromDictionary". This method takes a dictionary of key-value pairs and in the default implementation it runs through that dictionary and looks for any key names that match the "get" or "set" method call. For example, if the key is "value" then "takeValuesFromDictionary" would first look for a method implemented on the object called "setValue" and it would extract the value from the dictionary and pass that into the method. If that method were not there, it would look for an instance variable (IVAR).

The method for getting values is valuesForKeys:, which extracts the value for each key in the array passed in and returns the key-value pairs in a dictionary. When invoked, a property array from a key-value dictionary is provided to the process. The process examines the methods and instances of the object for matches to each property in the property array. When there is a match, the value associated with that method or instance is returned to the dictionary.

DETAILED DESCRIPTION OF THE INVENTION

A method for dynamic object communication protocol is described. In the following description, numerous specific details, are set forth in order to provide a more thorough description of the present invention. It will be apparent, however, to one skilled in the art, that the present invention can be practiced without these specific details. In other instances, well known features have not been described in detail so as not to obscure the present invention.

Programming System

The preferred embodiment of the present invention implements an object-oriented programming system using objective C language. Objective C is an extension to ANSI C that supports the definition of classes of objects and provides syntactic and run-time support for sending messages to objects. This language model is partially derived from SmallTalk and has been described in "Object-Oriented Programming; An Evolutionary Approach," Brad J. Cox, Addison-Wesley 1986 and in "SmallTalk-80: The Language and its Implementation," Adele Goldberg, Dave Robson, Addison-Wesley 1983.

Enterprise Objects

Although the present invention may be used with any objects, one embodiment of the present invention uses "enterprise" objects. An enterprise object is an Objective C object that conforms to the key-value coding protocol, whose properties (data) can map to stored data. An enterprise object brings together stored data with the methods for operating on that data. An enterprise object is like any other Objective C object, in that it couples data with the methods for operating on that data. However, an enterprise object class has certain characteristics that distinguish it from other Objective C classes:

It has properties that map to stored data; an enterprise object instance typically corresponds to a single row or record in a database.

It knows how to interact with other parts of the operating system to give and receive values for its properties.

The ingredients that make up an enterprise object are its class definition and the data values from the database row or record with which the object is instantiated. If the data store is a relational database, a third ingredient in an enterprise object is the model that defines the mapping between the class's object model and the database schema.

Present Invention

The transmission mechanism for data in the Enterprise Objects Framework is the key-value coding scheme of the present invention, in which the properties of an enterprise object are accessed indirectly by name, rather than directly through invocation of an accessor method or as instance variables. Thus, any object can represent its state as a dictionary whose keys are the names of its properties.

As noted above, an object consists of a data structure (instance variables or "IVARs) and the operations (methods) that can use or affect that data. Each of the instance variables has a name, such as "firstName", "lastName", "employeeNumber", etc. Often, there are two methods associated with each instance variable, one method to set the value of the associated instance variable (setValue) and one method to retrieve the value of the associated instance variable (getValue). These methods are not required to be associated with an object. There may be "set value/get value" pairs that are not mapped to a single instance variable but may still be associated with an object. For example there may be a method getFullName that is associated with three separate instance variables (first name, middle initial, and last name) and all three instance variables must be accessed to satisfy the method.

Loading Data into an Object

In the present invention, it may be desired to set data values of an object or an instance variable of an object. The format of the source of the data to be mapped may not be known. The present invention provides a general solution that does not require pre-knowledge of the data format.

In the preferred embodiment of the present invention, when data is taken from a database or other data source, each row is put into a dictionary. The dictionary consists of key-value pairs. For example, consider the database table in FIG. 4. The database table consists of five rows, each having the columns "lastName" 401, "firstName" 402, "employeeNumber" 403, "salary" 404, and "employmentStartDate" 405.

Figure 4:
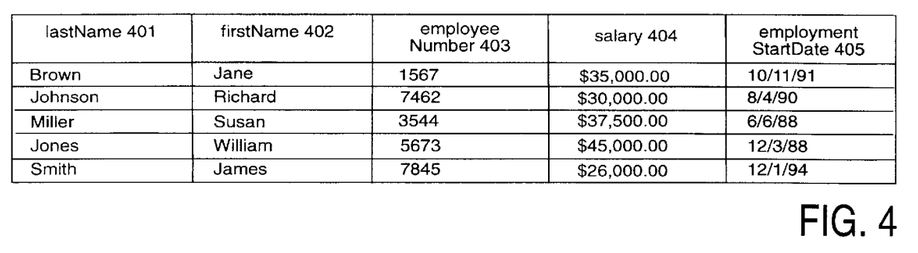
FIG. 4 is an example database table.
Figure 5:
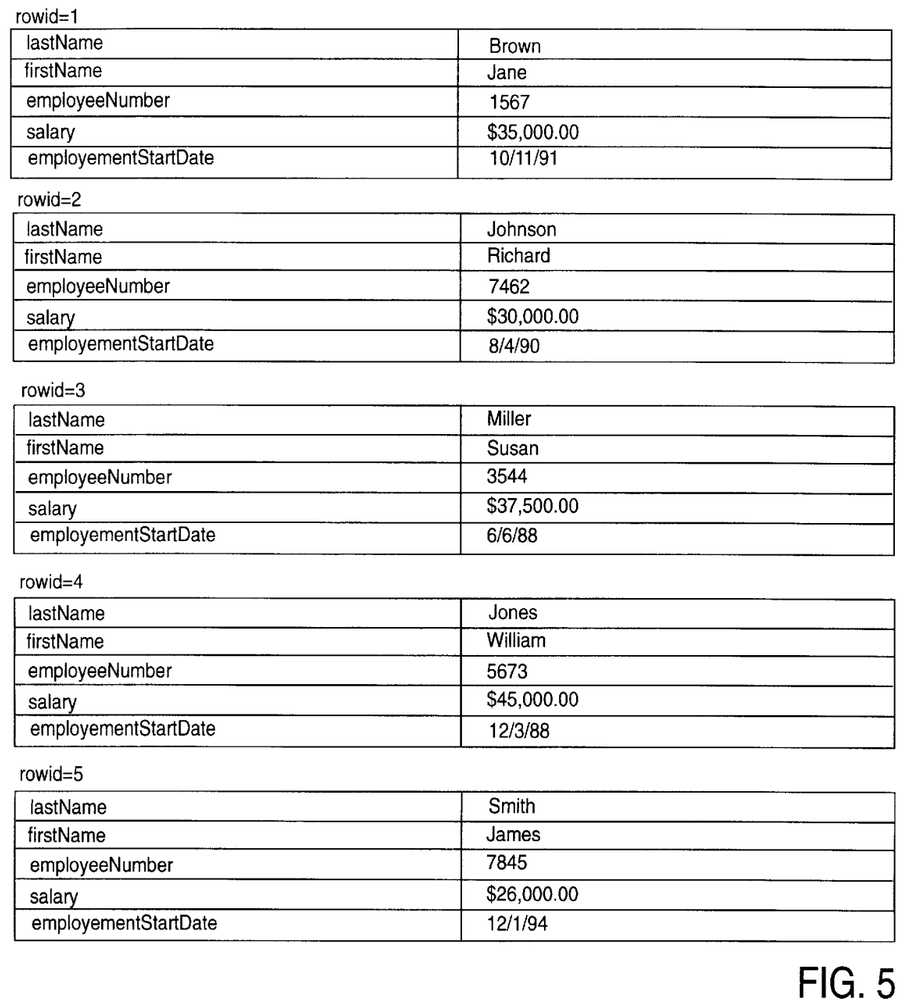
FIG. 5 is an example dictionary of the database table of FIG. 4.

A dictionary is created for each row of the table and consists of "key-value" pairs. The key is the column heading, and the value is the value under each column for that row. The dictionaries for each row (identified as rowid1 through rowid5) of the table of FIG. 4 are shown in FIG. 5. For example, the key-value pairs for the second row (rowid2) of the table of FIG. 4 are shown in FIG. 5 as "lastName—Johnson", "firstName—Richard", "employeeNumber—7462", "salary—$30,000.00" and "employmentStartDate—8/4/90".

When an object is to be loaded with values from a dictionary, the methods and instance variables of the object are examined to determine if there is a match between keys in the dictionary and the object. This is accomplished by searching for the method "set (property)" where property is the column name or key in the dictionary. For example, with property named "lastName", the system looks for a method of the form "setLastName". If there is a match, the value of the property "lastName" can be loaded into the object using the setLastName method.

If no methods produce a match, the system looks for an instance variable whose name is the same as the property's and sets its value directly.

When a dictionary is to be loaded with values from an object, the properties of the dictionary are provided as an array. For each property, the methods of the object are examined to determine if they are of the form "property". If there is a match, the object's value for that method is returned to the dictionary. If there is no match, the instances of the object are examined. If an instance is found that matches the property, the value is returned to the dictionary.

takeValuesFromDictionary

The method for setting values in an object is implemented by "takeValuesFromDictionary". This method is implemented on the root object of the environment so that, in a class hierarchy system, every object inherits the method. In the preferred embodiment of the invention, the default implementations of the key-value coding methods use the class definition as follows:

1. The key-value coding method looks for an accessor method based on the property name. For example, with a property named lastName, take ValuesFromDictionary: looks for a method of the form setLastName: (note that the first letter of the property name is made uppercase).
2. If the key-value coding method doesn't find an accessor method, it looks for an instance variable whose name is the same as the property's and sets or retrieves its value directly. In setting an instance variable, takeValuesFromDictionary: retains the new value and releases the old one.

The takeValuesFromDictionary method may be implemented as described in the pseudo code of the Appendix. The operation of takeValuesFromDictionary is illustrated in the flow diagrams of FIGS. 2A, 2B, and 2C.

takeValuesFromDictionary Flow

Figure 2A:
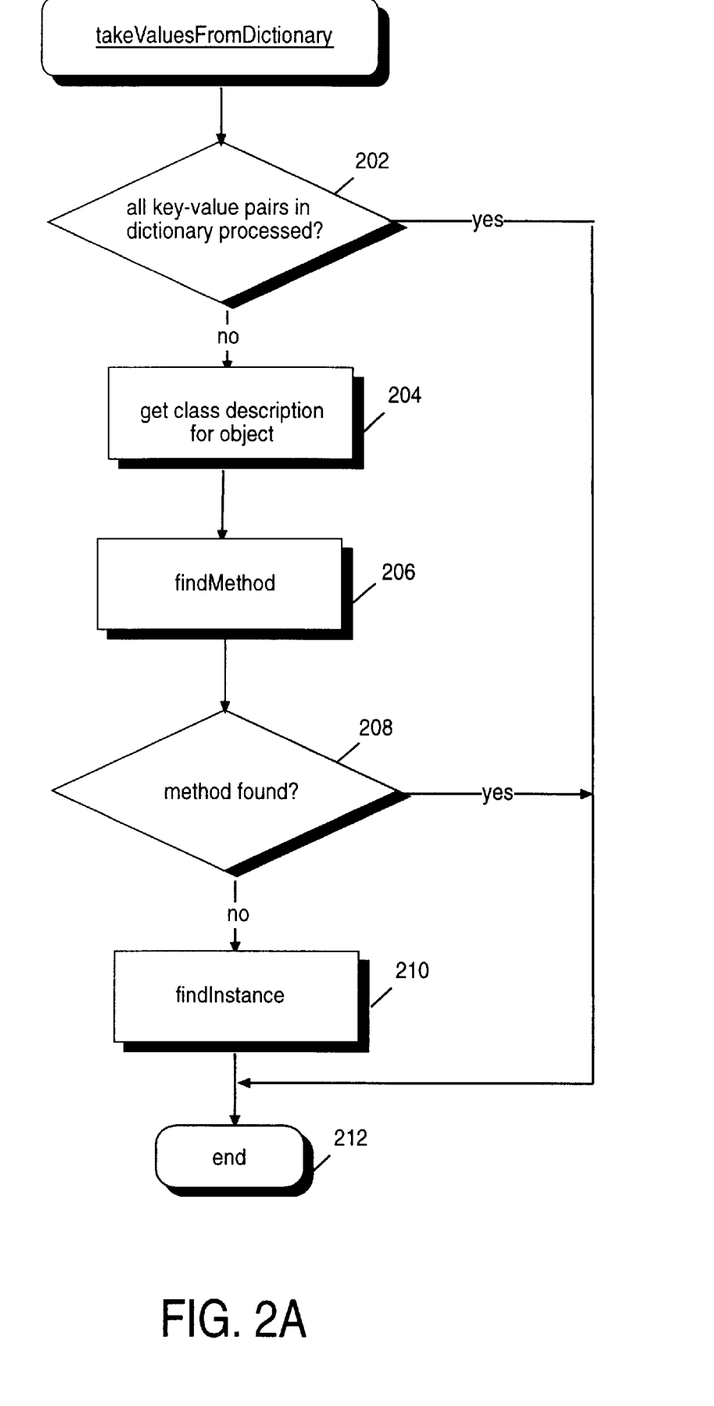
FIG. 2A is a flow diagram illustrating "takeValuesFromDictionary".

Referring first to FIG. 2A takeValuesFromDictionary is illustrated. At decision block 202, the argument "All key-value pairs in dictionary processed?" is made. This step checks to see if the object has been examined for all dictionary pairs. If the argument at decision block 202 is true, the system ends at step 212. That means that all dictionary pairs have been processed for the object, and thus the method is completed. If the argument at decision block 202 is false, not all pairs have been processed. At step 204 the class description for the object is obtained and examined. At step 206, "findMethod" is executed to determine if the object has a set method with a name that matches a property of the key-value pair. This step is illustrated in more detail in FIG. 2B.

After findMethod has been executed at step 206, the system proceeds to decision block 208. At decision block 208, the argument "method found?" is made. This step is to determine whether there has been a match between the methods of the object and the property of the key-value pair. If the argument at decision block 208 is true, a match has been found and the data can be loaded into the object. The routine of FIG. 2A ends at step 212. If the argument at decision block 208 is false, no methods have names that match the property of the key-value pair and the system must then check the instances of the object. This is accomplished by invoking "findInstance" at step 210. This step is illustrated in more detail in FIG. 2C. After findInstance has been executed, the system ends at step 212.

findMethod Flow

Figure 2B:
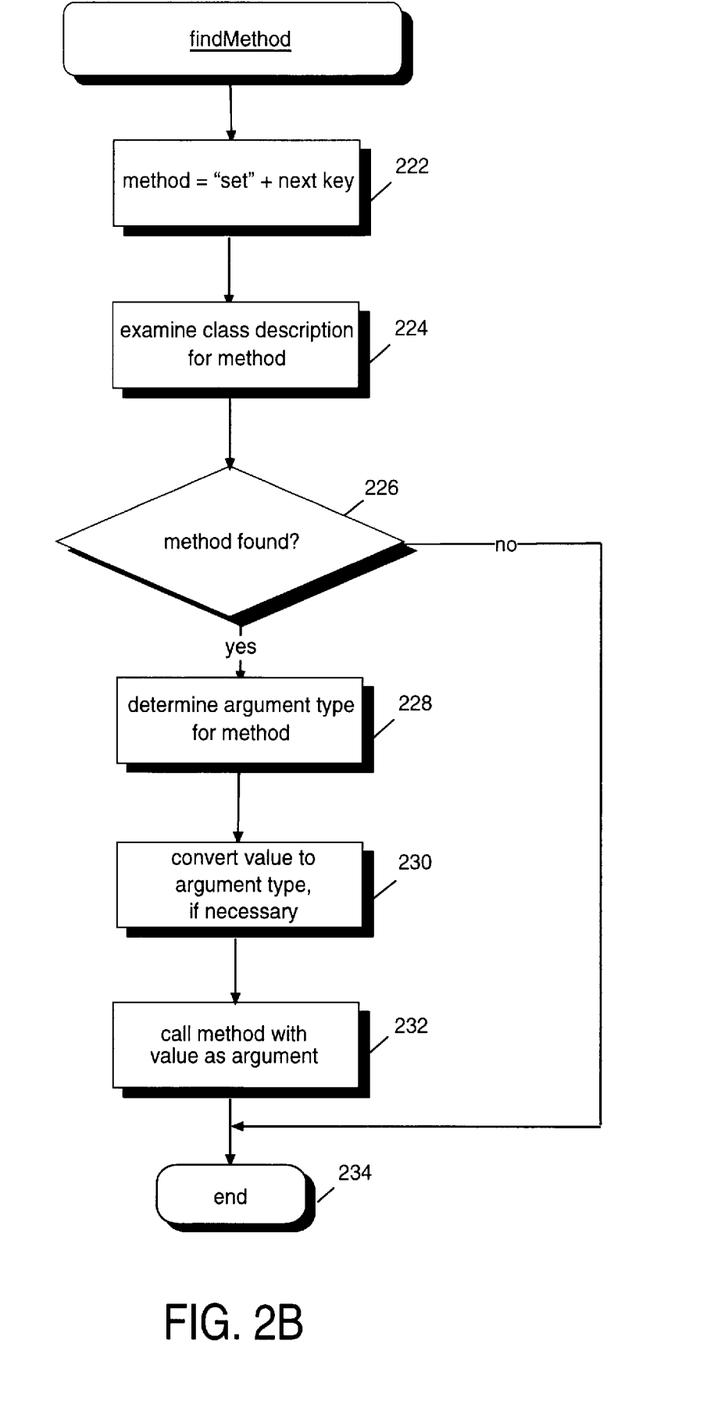
FIG. 2B is a flow diagram illustrating "findMethod".

Step 206 of FIG. 2A, "findMethod" is illustrated in more detail in FIG. 2B. The process "findMethod" is used to examine the methods of the object being examined to determine if its methods match the properties of the key-value pairs being processed. At step 222, the method to be searched for is defined as being of the type "set" plus the name of the property of the key being processed (e.g. if the property of the key-value pair is "lastName", then the system looks for "setLastName"). At step 224, the class description is examined for the method that is being searched. At decision block 226, the argument "method found?" is made. This is to determine if the object contains the method that is being searched. If the argument is false, findMethod ends at step 234 and returns to decision block 226 of FIG. 2A.

If the argument at decision block 226 is true, a match has been found. The system at 228 determines the argument type for the method. At step 230, the value of the key-value pair is converted to the argument type if necessary. At step 232, the method with the value as argument is called to load the data value into the object. At step 234, findMethod ends and returns to takeValuesFromDictionary of FIG. 2A.

findInstance Flow

Figure 2C:
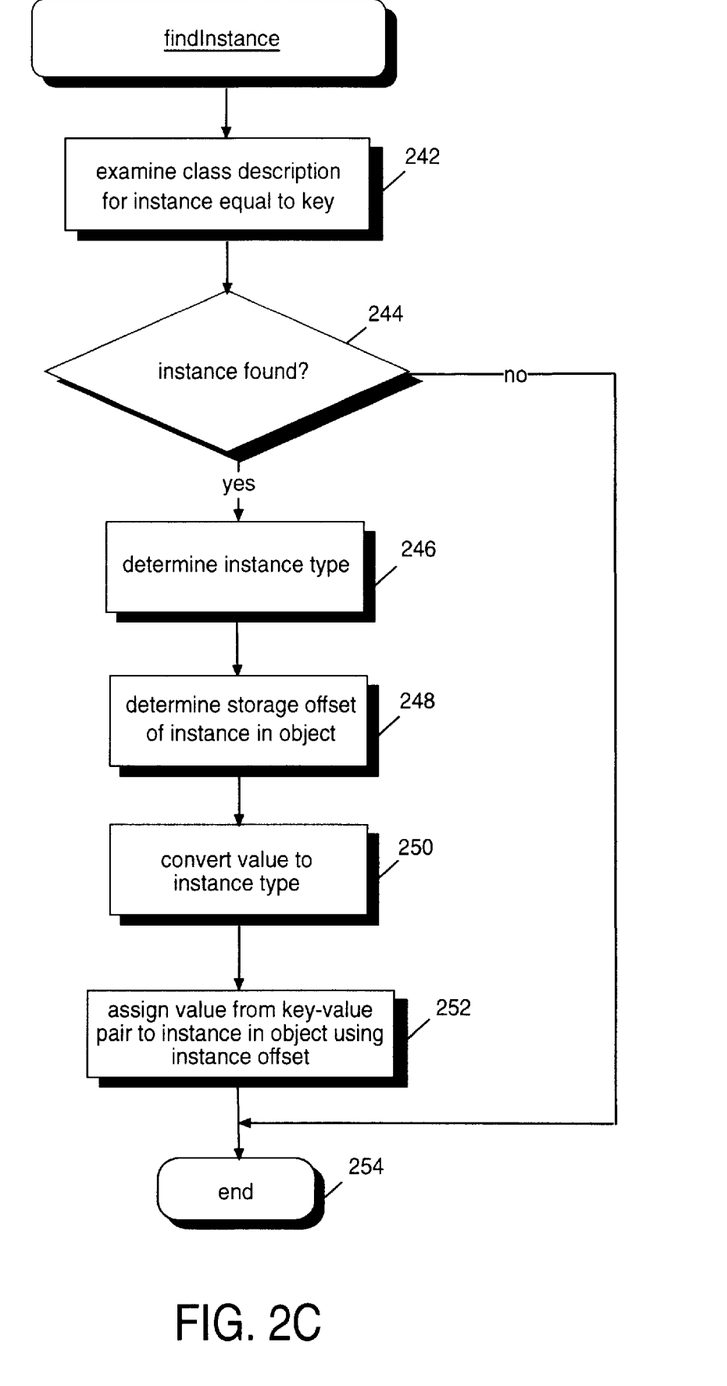
FIG. 2C is a flow diagram illustrating "findInstance".

Step 210 of FIG. 2A, "findInstance", is illustrated in FIG. 2C. In the preferred embodiment of the present invention, the methods of an object are examined first when attempting to load data. If no suitable methods are found, the instance variables are examined using "findInstance". At step 242, the class description of the object is examined to determine if there is an instance name equal to the key property of the key-value pair being processed. At decision block 244, the argument "instance found?" is made. If the argument is false, that is if no instances match the property, the findInstance process ends at step 244 and returns to step 212 of FIG. 2A.

If the argument at decision block 244 is true, a match between and instance variable and the key-value property has been found. The system then at step 246 determines the instance type. At step 248, the storage offset of the instance in the object is determined. At step 250, the value of the key-value pair being examined is converted to the object's instance type. At step 252, the value from the key-value pair is assigned to the instance in the object using the previously determined instance offset. At step 254, findInstance ends and returns to step 212 of FIG. 2A.

valuesForKeys

The method for loading a dictionary with values from an object is "valuesForKeys". The class definitions for valuesForKeys is as described above for "takeValuesForDictionary". The valuesForKeys method may be implemented as described in the pseudo code of the Appendix. The operation of valuesForKeys is illustrated in the flow diagrams of FIGS. 3A, 3B, and 3C.

valuesForKeys Flow

Figure 3A:
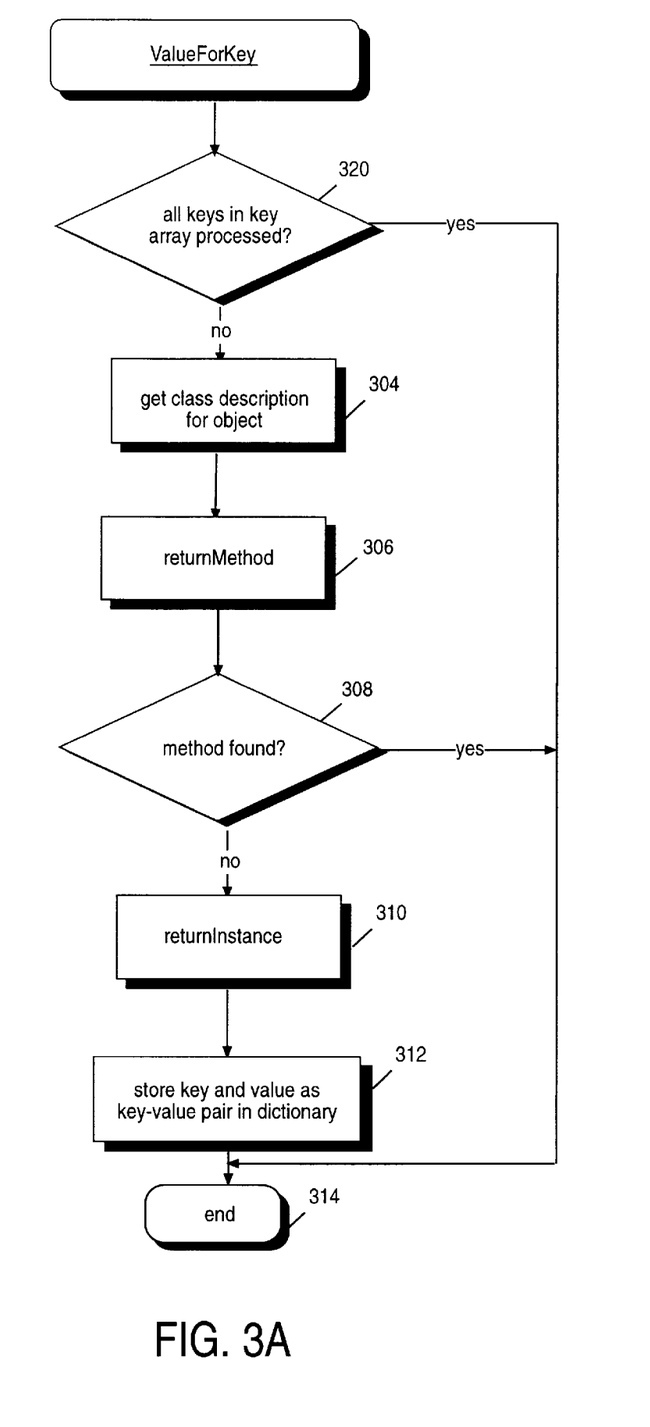
FIG. 3A is a flow diagram illustrating "valuesForKeys".

Referring first to FIG. 3A, valuesForKeys is illustrated. When valuesForKeys is invoked, it is to take data from an object and load it into a data destination (e.g. a relational database). The properties of the keys of the key-value dictionary of the data destination are put into a key array. At decision block 320, the argument "All keys in key array processed?" is made. If the argument is true, all array entries have been processed and the method is over, the process ends at step 314. If the argument is false, the next key in the key array is processed. At step 304, the system gets the class description for the object. At step 306, "returnMethod" is executed to determine if the object has any methods (e.g. setValue, getValue, etc.) that have a name that matches the key property. This step is illustrated in more detail in FIG. 3B.

After returnMethod has been executed at step 306, the system returns to decision block 308. At decision block 308, the argument "method found?" is made. This step is to determine whether their was a match between any of the methods of the object and the key property. If the argument at decision block 308 is true, a match has been found and the data can be loaded into the data destination. The process then ends at step 314. If the argument at decision block 308 is false, no methods match the key property. The system then checks the instance variables for matches. This is accomplished by invoking "returnInstance" at step 310. This step is illustrated in more detail in FIG. 3C. After returnInstance has been executed, the process stores the key and returned value as a key-value pair in the key-value dictionary. At step 314, valuesForKeys ends.

returnMethod Flow

Figure 3B:
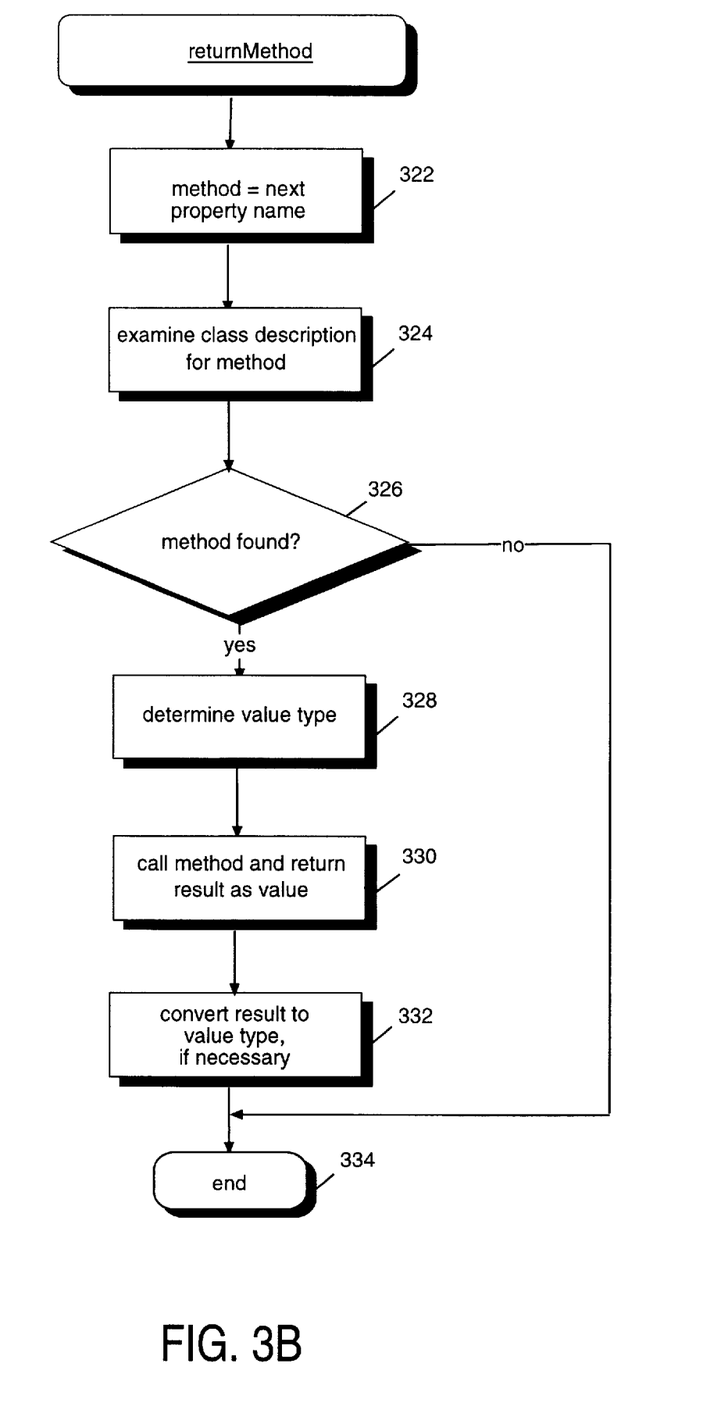
FIG. 3B is a flow diagram illustrating "returnMethod".

Step 306 of FIG. 3A, "returnMethod", is illustrated in FIG. 3B. The process "returnMethod" is used to examine the methods of the object to determine if the name of any of its methods matches the property of the key property array value being processed. At step 322, the method to be searched for is made defined as one having the current key property. At step 324, the class description is examined for the defined method. At decision block 326, the argument "method found?" is made. If the argument is false, there is no match, returnMethod ends at step 334 and returns to valuesForKeys of FIG. 3A.

If the argument is true, at step 328, a match has been found. At step 328, the value type of the method is determined. At step 330, the method is called and returns the result as value. At step 332, the process converts the value to value type, if necessary, and the value can be loaded into the data destination. The process returnMethod ends at step 334.

returnInstance Flow

Figure 3C:
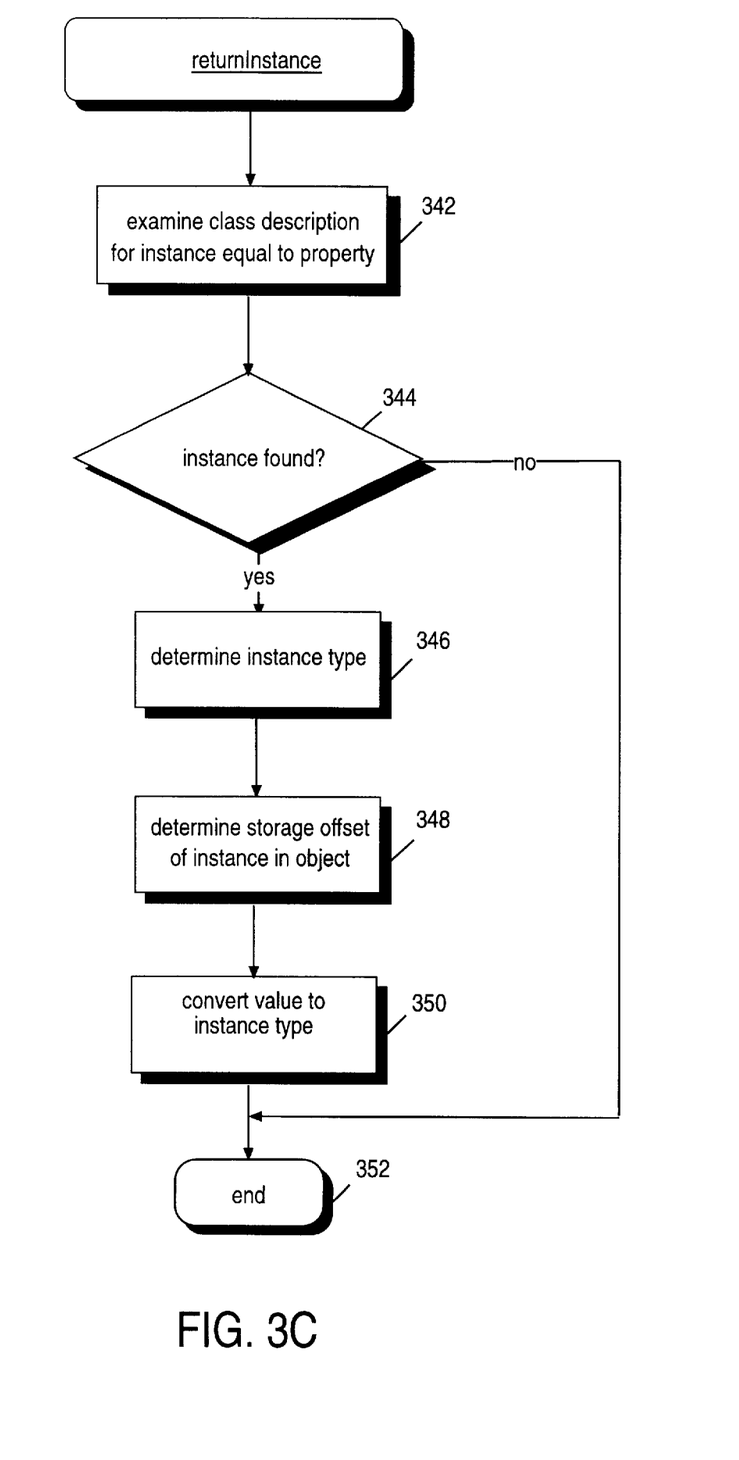
FIG. 3C is a flow diagram illustrating "returnInstance".

Step 310 of FIG. 3A, "returnInstance" is illustrated in FIG. 3C. In the preferred embodiment of the present invention, this process is invoked only when no matching methods have been found for a key property being processed. At step 342, the class description is examined to determine if there is an instance variable with a name that matches the key property. At decision block 344, the argument "instance found?" is made. If the argument is false, no matches have been found, the returnInstance process ends at step 352 and returns to valuesForKeys of FIG. 2A.

If the argument at decision block 344 is true, there is a match of an instance variable and the key property. At step 346, the type of the instance variable is determined. At 348, the storage offset of the instance variable in the object is determined. At step 350, the value of the instance is converted to instance type and can be loaded into key-value pair of the dictionary of the data destination. At step 352, returnInstance ends and returns to valuesForKeys of FIG. 3A.

Type-Checking and Type Conversion

The preferred embodiment implementations of the key-value coding methods of the present invention accepts any id type as a value, and does no type-checking or type conversion among object classes. It is possible, for example, to pass a string to takeValuesFromDictionary: as the value for a property the receiver expects to be an date. The sender of a key-value coding message is responsible for ensuring that the values are of the proper class. An enterprise object controller (EOController), for example, converts string values from the user interface with its data source's coerceValue:forKey: method.

The key-value coding methods handle one special case with regard to value types. Numeric values must be transferred in dictionaries as number objects. Most objects store numeric properties as C scalar (numeric) types and declare their access methods to handle them in that form. In the present invention numeric property values are handled as string objects in addition to being represented as numbers in dictionaries. Because numeric properties are common, the default implementations of the key-value coding methods convert an object value to the C scalar (numeric) type required by the enterprise object's accessor method or instance variable. For example, consider where an enterprise object defines the accessor methods:

-(void)setSalary:(unsigned int)salary
-(unsigned int)salary

Fo the setSalary: method, takeValuesFromDictionary: converts the object value for the "salary" key in the dictionary to an unsigned integer and passes it as salary. Similarly, valuesForKeys: converts the return value of the salary method to an number and inserts that into the dictionary that it returns.

The default implementations support the following scalar types:

| char  | unsigned char  |
|-------|----------------|
| short | unsigned short |
| int   | unsigned int   |
| long  | unsigned long  |
| float | double         |

Object values are converted to these types with the standard messages charValue, intValue, floatValue, and so on. The key-value coding methods don't check that an object value actually responds to these messages; this can result in a run-time error if the object doesn't respond to the appropriate message.

An issue to consider in using C scalar types is that some relational databases allow the use of a NULL value distinct from any numeric value, represented in the Enterprise Objects Framework by the EONull class. Since the C scalar types can't accommodate a distinct NULL value, the default implementations of the key-value coding methods raise NSInvalidArgumentException on encountering an EONull object that needs to be converted. A database could be designed not to use NULL values for numeric columns, or the enterprise object class could be defined to use number objects where NULL values are allowed.

Implementing Key-Value Coding Methods

An enterprise object class can either rely on the default behavior of its superclass or override it, partially or completely. For example, a subclass of an object may have a few properties that it needs to handle in a special way, but the rest can all be handled by the default implementation. In this case, the methods of this category may be implemented according to the following templates.

```
-(BOOL)takeValuesFromDictionary: (NSDictionary*)aDictionary
(
    NSMutableDictionary *mutDict;
    /* Make a mutable version of the passed-in dict. */
    mutDict = [(aDictionary mutableCopy) autorelease];
    /*Take whatever values you need from mutDictionary, removing
them
        *from mutDict as you do so.
        */
    return (super takeValuesFromDictionary:mutDict);
)
``` take ValuesFromDictionary: here creates its own mutable copy of the dictionary passed in. It handles the keys it needs to, removing them from the dictionary so that the superclass' implementation won't set them as well, and then passes the remaining key-value pairs to the superclass. To fully override the superclass' implementation this method handles every key-value pair in the dictionary, returning YES if all key-value pairs were handled, and NO if any of them couldn't be processed.

```
-(NSDictionary *)valuesForKeys:(NSArray *)keys
(
        NsMutableArray *mutKeys = [(keys mutableCopy) autorelease];
        NSMutableDictionary *mutDict = [NSMutableDictionary
dictionary];
        int i;
        for (i = [mutKeys count] - 1; i >= 0; i--) (
                /* See if you can put the value for the key at i into
mutDict.
                 * If your object stores the value as a mutable object you
                 * should create an immutable copy and autorelease it
before
                 * putting it into mutDict. mutDict will retain what you
give
                 * it as needed.
                 */
                if (/* you put the value for the key at i in the dict */)
(
                        [mutKeys removeObjectAtIndex:i];
                )
        );
        [mutDict addEntriesFromDictionary: [super
valuesForKeys:mutKeys]];
        return mutDict;
)
``` valuesForKeys: creates a mutable copy of the key array passed in, and a mutable dictionary in which to place the values requested. It handles the keys it needs to and removes them from the array, then passes the remaining keys to the superclass and adds the returned values to the dictionary it's building. To override the superclass' implementation this method omits the message to the superclass after putting all the values it can find for the keys into the dictionary.

The default implementation of take ValuesFromDictionary: does not guarantee the order that property values are set. Thus, the object's accessor methods shouldn't assume that other properties' values have been established when they are invoked.

It is possible for a property's value in a database to be NULL, in which case the enterprise object receives an EONull object as the value. If NULL values are permitted in the database, the objects should check whether the values they receive are EONulls.

Method Types

| Setting and getting values | -take ValuesFromDictionary: |
|                            | -valuesForKeys: |
| Resetting key bindings     | -flushKeyBindings |

Instance Methods flushKeyBindings

-(void)flushKeyBindings

Invalidates the cached key-binding information for the receiver's class. The Enterprise Objects Framework uses this information to optimize the default implementations of the other methods of this protocol by caching method selectors and instance variable type information. This method is invoked whenever a class is modified or removed from the runtime system.

takeValuesFromDictionary:

-(BOOL)take ValuesFromDictionary:(NSDictionary*) aDictionary

This sets properties of the receiver with values from aDictionary. Returns YES if the receiver read all values from the dictionary, NO if it couldn't take all values.

valuesForKeys:

-(NSDictionary*)valuesForKeys:(NSArray*)keyArray

This returns a dictionary providing as many values as possible for the keys in keyArray. Not all values requested are guaranteed to be retrieved.

COMPUTER SYSTEM

Figure 1:
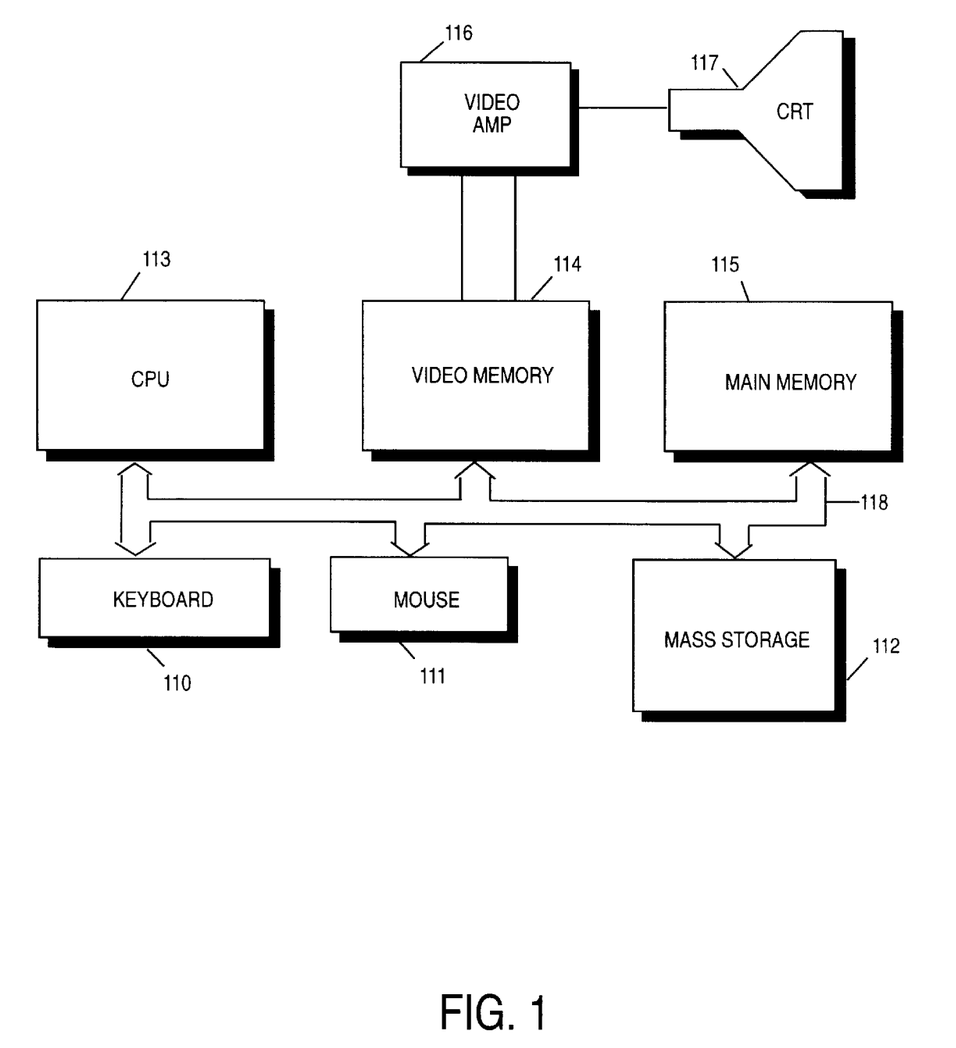
FIG. 1 illustrates a computer system for implementing the present invention.

The present invention may be implemented on any conventional or general purpose computer system. An example of one embodiment of a computer system for implementing this invention is illustrated in FIG. 1. A keyboard 110 and mouse 111 are coupled to a bidirectional system 119. The keyboard and mouse are for introducing user input to the computer system and communicating that user input to CPU 113. The computer system of FIG. 1 also includes a video memory 114, main memory 115 and mass storage 112, all coupled to bi-directional system bus 119 along with keyboard 110, mouse 111 and CPU 113. The mass storage 112 may include both fixed and removable media, such as magnetic, optical or magnetic optical storage systems or any other available mass storage technology. The mass storage may be shared on a network, or it may be dedicated mass storage. Bus 119 may contain, for example, 32 address lines for addressing video memory 114 or main memory 115. The system bus 119 also includes, for example, a 32-bit data bus for transferring data between and among the components, such as CPU 113, main memory 115, video memory 114 and mass storage 112. Alternatively, multiplex data/address lines may be used instead of separate data and address lines.

In the preferred embodiment of this invention, the CPU 113 is a 32-bit microprocessor manufactured by Motorola, such as the 68030 or 68040. However, any other suitable microprocessor or microcomputer may be utilized. The Motorola microprocessor and its instruction set, bus structure and control lines are described in MC68030 User's Manual, and MC68040 User's Manual, published by Motorola Inc. of Phoenix, Ariz.

Main memory 115 is comprised of dynamic random access memory (DRAM) and in the preferred embodiment of this invention, comprises 8 megabytes of memory. More or less memory may be used without departing from the scope of this invention. Video memory 114 is a dual-ported video random access memory, and this invention consists, for example, of 256 kbytes of memory. However, more or less video memory may be provided as well.

One port of the video memory 114 is coupled to video multiplexor and shifter 116, which in turn is coupled to video amplifier 117. The video amplifier 117 is used to drive the cathode ray tube (CRT) raster monitor 118. Video multiplexing shifter circuitry 116 and video amplifier 117 are well known in the art and may be implemented by any suitable means. This circuitry converts pixel data stored in video memory 114 to a raster signal suitable for use by monitor 118. Monitor 118 is a type of monitor suitable for displaying graphic images, and in the preferred embodiment of this invention, has a resolution of approximately 1020× 832. Other resolution monitors may be utilized in this invention.

The computer system described above is for purposes of example only. The present invention may be implemented in any type of computer system or programming or processing environment.

UNDO AND REDO

The present invention can be utilized to provide an undo and/or a redo operation. When invoking takeValuesFromDictionary, first invoke valuesForKeys on the object with the key of interest. This returns a dictionary containing the original data values of the object that are about to be changed. This returned dictionary is saved in a "stack" or other suitable storage means. A stack is a data structure that supports "push" and "pop" operations. A push operation places data onto the stack and a pop operation removes data from the stack. The stack functions as a "last-in-first-out (LIFO)" data structure. The takeValuesFromDictionary operation then proceeds as described above.

If the operation of the takeValuesFromDictionary method is to be rolled back, it is only necessary to restore the original object values from the stack. This can be accomplished by applying takeValuesFromDictionary to the object using the stack data.

If desired, a copy of the results of either the takeValuesFromDictionary or valuesForKeys operation can be placed in a second stack of data values and used for re-do operations. This may be done in conjunction with the undo operations described above so that any undone operations may be redone.

Thus, a method of dynamic object communication protocol is described.

APPENDIX

```
// We provide a default implementation of the Key-Value Coding Protocol
// on the root class in the NEXTSTEP object hierarchy, NSObject. All
// classes inheriting from NSObject will automatically get this
// implementation. However, classes may override this behavior by
// implementing their own versions of takeValuesFromDictionary and/or
// valuesForKeys.
@interface NSObject (KeyValueCoding)
- takeValuesFromDictionary:(Dictionary *)valueDictionary;
- (Dictionary *)valuesForKeys:(Array *)keyArray;
@end
@implementation NSObject (KeyValueCoding)
// Aggregate versions added to the root object class
- takeValuesFromDictionary:valueDictionary
{
    for each key and value in dictionary do {
        [self takeValue:value forKey:key];
    }
}
- (Dictionary *)valueForKeys:keyArray
{
    id resultDictionary = [Dictionary new];
    for each key in keyArray {
        value = [self valueForKey:key];
        [resultDictionary setValue:value forKey:key];
    }
    return resultDictionary;
}
// single value versions
- takeValue:value forKey:key
{
    classInfo = [self getClassInfo];
    // look if they have method of name "set<KeyName>"
    methodInfo = [classInfo lookupMethodNamed: "set"+key];
    if (methodInfo) {
        type = getArgumentType
        switch (type) {
          OBJECT:
              [self callMethodNamed:"set"+key withArgument:value];
          FLOAT:
              [self callMethodNamed:"set"+key withArgument:[value floatValue]];
          All other types . . .
        }
    } else {
        // look for instance variable
        instanceVariableInfo = [classInfo lookupInstanceVariableNamed:key];
        if (instanceVariableInfo) {
            type = [instanceVariableType];
            // perform assignment to instance variable
            offsetOfVariable = [instanceVariableInfo offset];
            switch (type) {
            OBJECT:
                *(id)(self + offsetOfVariable) = valueToAssign;
                break;
            FLOAT:
                *((float *)(self + offsetOfVariable)) = [value floatValue];
                break;
            All other types . . .
            }
        }
    }
}
```

APPENDIX

```
}
- valueForKey:key
    // like takeValue:forKey except backwards . . . ;-) I.e.:
    classInfo = [self getClassInfo];
    // look if they have method with the same name as the key.
    // e.g. "firstName"
    methodInfo = [classInfo lookupMethodNamed:key];
    if (methodInfo) {
      type = getArgumentType
      switch (type) {
        OBJECT:
                return [self callMethodNamed:key];
                FLOAT:
                // this method actually returns a C scalar numeric type, not an
                // object, so we have to put an "object wrapper" around the value
                // returned.
                    return [NSNumber numberWithFloat:(float)[self
                            callMethodNamed:key]];
            All other types . . .
        }
    } else {
        // look for instance variable
        instanceVariableInfo = [classInfo lookupInstanceVariableNamed:key];
        if (instanceVariableInfo) {
            type = [instanceVariableType];
                // perform assignment to instance variable
                offsetOfVariable = [instanceVariableInfo offset];
            switch (type) {
                OBJECT:
                    return *(id)(self + offsetOfVariable);
                    break;
                FLOAT:
                    // this variable is actually a C scalar numeric type, not an
                    // object, so we have to put an "object wrapper" it.
                    return [NSNumber numberWithFloat:
                            *((float *)(self + offsetOfVariable))];
                    break;
                All other types . . .
            }
        }
    }
}
The actual implementation of the above caches the state necessary to perform a get or set
operation in a "binding" object; The actual scanning of class information only occurs
the first time a get or set operation is performed for a particular key.
@end
```

We claim:

1. A method for communicating data from a data source to an object oriented object, said object oriented object having a method or an instance variable, said method for communicating data comprising the steps of:

retrieving column headings and rows from said data source;

creating a dictionary of key-value pairs for each of said rows, said key representing a property name of one of said column headings and said value representing a data value from one of said rows;

obtaining one of said key-value pairs from said dictionary;

searching said object oriented object for a method of the name "set" plus the property name of said key;

loading said value into said object oriented object when said object oriented object has a method of the name "set" plus said property name;

searching for an instance variable with the same name as said property if no method of the name "set" plus the property name of said key is found;

loading said value into said object oriented object when said object oriented object has an instance variable with said property name.

2. The method of claim 1 wherein said data source comprises a database.

3. The method of claim 1 further including the steps of:

determining the argument type of said method when said object oriented object has a method of the type "set" plus said property name;

converting said value to said argument type when said value is not of said argument type;

calling said method with said value as an argument.

4. The method of claim 1 further including the steps of:

determining an instance type when said object oriented object has an instance variable that is with said property name;

determining a storage offset of said instance variable in said object oriented object;

converting said value to said instance type when said value is not of said instance type;

assigning said value to said instance variable using said storage offset.

5. The method of claim 1 wherein said object oriented object is an enterprise object.

6. A method of communicating data from an object oriented object to a data destination, said object oriented object having a method or an instance variable, said method of communicating comprising the steps of:

retrieving column headings and rows from said data destination;

creating a dictionary of key-value pairs for each of said rows, said key representing a property name of one of said column headings and said value representing a data value from one of said rows;

obtaining one of said key-value pair from said dictionary;

searching said object oriented object for a method with said property name;

replacing said dictionary value with a data value from said object oriented object when said object oriented object has a method with said property name;

searching said object oriented object for an instance variable with said property name if no method with said property name is found;

replacing said dictionary value with an instance variable when said object oriented object has an instance variable with said property name;

storing said dictionary values in said data destination.

7. The method of claim 6 wherein said data destination comprises a database.

8. The method of claim 6 further including the steps of:

determining the value type when said object oriented object has a method with said property name;

calling the method and returning the result as a resulting value;

converting the resulting value to said value type when said resulting value does not match said value type;

storing said key and said resulting value as a key-value pair in said dictionary.

9. The method of claim 6 further including the steps of:

determining an instance type of an instance variable value when said object oriented object has an instance variable with said property name;

determining a storage offset of said instance variable in said object oriented object;

converting said value to said instance type when said value does not match said instance type;

storing said key and said instance variable value as a key-value pair in said dictionary.

10. The method of claim 6 wherein said object oriented object in an enterprise object.

* * * * *